F. C. GRANT.
ATTACHMENT FOR AUTOMOBILE PEDALS.
APPLICATION FILED JUNE 8, 1918.
1,310,186.
Patented July 15, 1919.
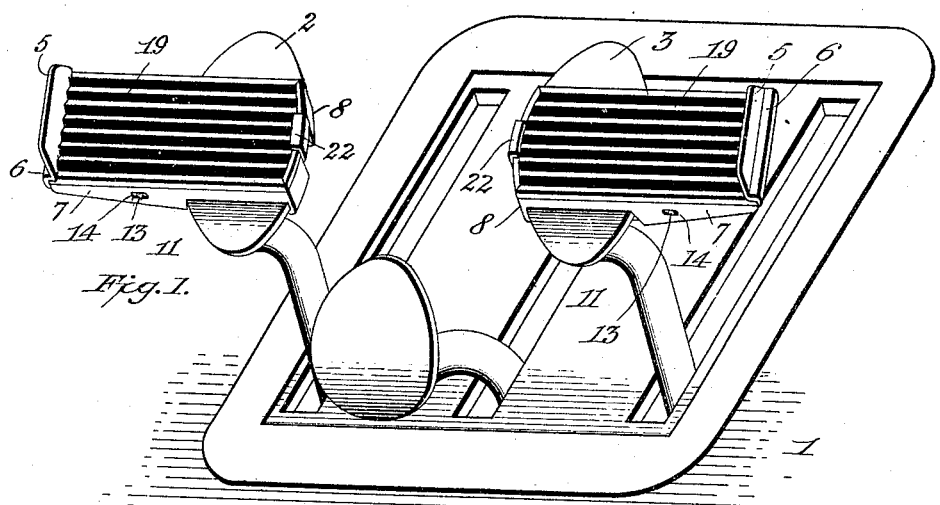
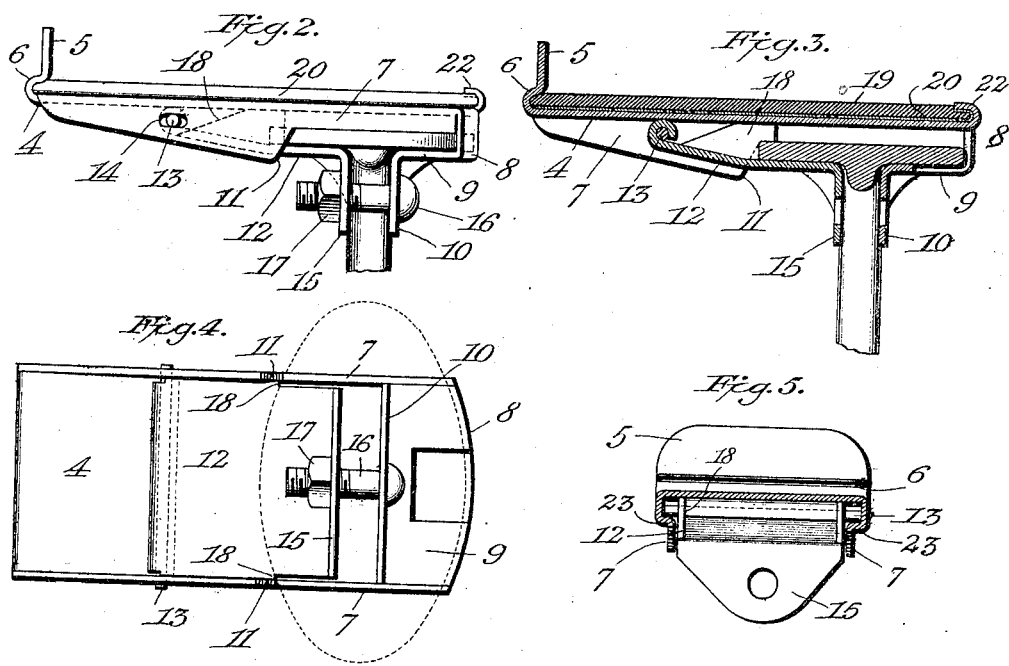
Inventor:
Frederick C. Grant.
G. Sargent Elliott
his Attorney.
THE COLUMBIA PLANOGRAPH CO., WASHINGTON, D. C.

UNITED STATES PATENT OFFICE.

FREDERICK C. GRANT, OF CHICAGO, ILLINOIS.

ATTACHMENT FOR AUTOMOBILE-PEDALS.

1,310,186. Specification of Letters Patent. Patented July 15, 1919.

Application filed June 8, 1918. Serial No. 238,940.

*To all whom it may concern:*

Be it known that I, FREDERICK C. GRANT, a citizen of the United States of America, residing at Chicago, county of Cook, and State of Illinois, have invented a new and useful Attachment for Automobile-Pedals, of which the following is a specification.

This invention relates to attachements for the foot pedals of automobiles.

The object of the invention is to provide an attachment in the form of a plate which is adapted to be secured upon the clutch and brake pedals of an automobile, to provide ample foot support for the driver thereof, the said plates extending laterally in opposite directions and being provided on their outer ends with vertical stops to prevent the feet from slipping over the outer ends of the plate, the plates being provided with means for securing them to the said pedals.

Further, to provide a foot-supporting attachment for automobile foot pedals of a style in common use, which can be easily and quickly attached, and which is provided with means for securing thereto a resilient foot pad.

These objects are accomplished by the device illustrated in the accompanying drawings, in which:

Figure 1 is a perspective view illustrating the application of the attachment to the brake and clutch pedals of an automobile.

Fig. 2 is a side view of one of the attachments showing the same clamped to a pedal.

Fig. 3 is a longitudinal sectional view of the same.

Fig. 4 is a bottom plan view of the attachment.

Fig. 5 is a transverse vertical sectional view of a modified form of the attachment; and Fig. 6 is an end view of the pad showing the depression in the retaining plate to receive the securing tongue.

Similar letters of reference refer to similar parts throughout the several views.

Certain styles of automobiles in common use are provided with pedals for operating the clutch and brake, respectively, which are of such size and shape as to render their manipulation both troublesome and inconvenient.

The person driving a car always keeps one foot on the brake pedal and the other foot on the clutch pedal for immediate action, and these pedals in some cars are so small that the driver finds it a difficult matter to keep his feet on them, and more particularly when they are not provided with anything in the nature of a stop to keep the feet from a lateral sliding movement, and the liability of accident is greatly increased should either foot slip from its pedal at a critical moment. The present invention overcomes these objectionable features by providing an attachment which is quickly and easily applied to the pedals, which affords ample support for the feet, and which keeps the feet from slipping over the outer ends of the pedals.

Referring to the accompanying drawings:

The numeral 1 indicates the front floor portion of an automobile; 2 the clutch pedal; and 3 the brake pedal. These pedals illustrate a type of pedal in common use, which are provided with foot portions that are substantially elliptical in form, and so relatively small as to provide inadequate support for feet of average size, and the improved attachement is adapted to be applied to this style of pedal to provide adequate support for the feet of the driver of the car.

The improved pedal attachment comprises a metal plate 4, of suitable dimensions, one end of which terminates in an upright stop 5, to prevent outward slipping of the foot. The portion of metal forming the stop 5, is first bent or rolled inward from the adjacent end of the plate to form an engaging lip 6, for one end of a pad to be hereinafter described. The side portions of the plate are also bent downward at right angles to the plate to form narrow depending members 7. At a point from the stop 5, corresponding to the desired length of the attachment, the plate is bent downward at right angles for a distance sufficient to form an abutment 8, for engaging one edge of the pedal, and from this point the metal is again bent inward to form a horizontal clamping member 9, which is adapted to engage a portion of the underside of the pedal, the member terminating in a depending abutment lip 10, having a bolt receiving hole.

The depending side members 7, are formed with abutments or shoulders 11, which act in conjunction with the abutment 8, to engage the opposite side edges of the pedal, and as the pedals are substantially elliptical in outline, these abutments prevent both sidewise and endwise movement of the attachment on the pedal. Coöperating with the clamp 9, is a swinging clamp 12, in the form of a strip of metal, one end of which is rolled or bent around a rod 13, which extends slightly beyond each side of the clamp to form trunnions which pass through elongated apertures or slots 14, in the depending sides 7, of the foot support, the slots 14 permitting any slight adjustment which variations in the width of the pedal may make necessary.

From the rod 13, the clamp extends inward at a slight downward inclination to the edge of the pedal, and then is horizontally disposed to engage or clamp a portion of the under side of the pedal, this clamping portion terminating in a depending abutment lip 15, corresponding to the lip 10, of the clamp 9, and the lip 15 is also provided with a bolt hole in line with the hole in the lip 10.

A bolt 16 is passed through these holes, its head bearing against one of the lips 10 or 15, as the case may be, and a nut 17 is screwed on the outer end of the bolt and against the other lip, thereby securely clamping the foot support to the pedal. The clamp 12, is provided on its opposite side with members 18, which are bent up at right angles, and the upper edges of these members engage the under side of the foot supporting plates, and their vertical edges engage the adjacent edge of the pedal. These members 18, not only form pedal engaging abutments, but they also give rigidity to the clamp when the same is drawn upon by the action of the nut 17.

It is preferable to use a resilient pad in connection with the attachment, and this pad is arranged and secured to the attachment in the following manner:

The pad, proper, consists of a rubber plate 19, of the same dimensions as the attachment, and which is preferably formed with longitudinal corrugations. This pad is supported upon a retaining plate 20, the sides and one end of which are bent or rolled over the corresponding edges of the pad to hold the same upon the plate. The outer end of each pad is straight, and the end of the plate 20, is not rolled over this end, as will be seen by reference to Fig. 3, but the inner end of the pad is curved to correspond to the curvature of the attachment, which is thus curved to conform to the shape of the pedal.

The end portion of each plate 20, which is rolled over the end of the pad, is provided with a depression 21, to receive a tongue 22, which is cut out of the clamp 9, and bent up and over the end of the pad, and rests in the depression 21, when the pad is in place. In securing the pad to the attachment, the curved end of the same is placed under the tongue 22, so that the said tongue will rest in the depression 21; the pad is then pressed down until its opposite straight end is forced or sprung under the lip 6, which is formed in the stop 5, and the pad is thus held securely in place, the tongue 22 resting in the depression 21, preventing lateral slipping of that end of the pad.

In Fig. 5, I have shown a modification of the plate in which the elongated holes 14, are dispensed with, and the depending sides of the plate are bent as shown, to provide horizontal ledges 23, which form supports or bearings for the ends of the rod 13, of the swinging clamp 12.

Having described my invention, what I claim as new and desire to secure by Letters Patent, is:

1. In a pedal attachment of the character described, the combination with a pedal, of a plate bent to engage one edge and a portion of the under side of the pedal on one side of its longitudinal center, and terminating in a vertical depending lip, abutments on said plate for engaging the other edge of the pedal, a member connected to the plate for engaging the under side of the pedal on the opposite side of its longitudinal center and terminating in a depending lip, and clamping means for drawing said lips toward each other.

2. In a pedal attachment of the character described, the combination with a pedal, of a plate having a vertical stop at one end and bent at its other end to engage the adjacent edge and under side portion of the pedal and terminating in a depending lip, abutments on said plate for engaging the opposite edge of the pedal, a member connected to the plate for engaging the under side of the pedal adjacent the said abutments and terminating in a depending lip, a bolt extending through said depending lips, and a clamping nut on said bolt.

3. In a pedal attachment of the character described, the combination with a pedal, of a foot supporting plate having a vertical stop at one end and bent at its opposite end to engage one edge and a portion of the under side of the pedal and terminating in a depending lip, a member in adjustable engagement with the plate which engages the opposite portion of the under side of the pedal and terminates in a depending lip, a bolt extending through said lips having a clamping nut thereon, and abutments on the plate for engaging the other edge of the pedal.

4. In a pedal attachment of the character described, the combination with a pedal, of a foot supporting plate having a stop at one end, and bent at its other end to engage one edge and a portion of the under side of the pedal, and terminating in a depending lip, a member in swinging engagement with the plate for engaging the other portion of the under side of the pedal and terminating in a depending lip, a bolt extending through said lips having a clamping nut thereon, and abutments on said plate for engaging the other edge of the pedal.

5. In a pedal attachment of the character described, the combination with a pedal, of a foot supporting plate having a stop at one end, and bent at its other end to form abutments to engage one edge of the pedal, and a clamping member to engage a portion of the under side thereof, the clamping member terminating in a depending lip, an oppositely arranged clamping member for engaging the under portion of the pedal having a depending lip and having an adjustable swinging connection at its opposite end with the plate, stops on the opposite edges of the plate for engaging the opposite edges of the pedal, and a bolt extending through said lips having a clamping nut on its outer end.

6. In a pedal attachment of the character described, the combination with a pedal, a foot supporting plate thereon, and means for clamping said plate to said pedal, of a pad for said plate, a stop on one end of the plate having a portion which engages one end of said pad and a tongue on the other end of the plate which is bent over to engage the opposite end of the pad.

7. The combination with a pedal attachment of the character described, and means for securing the same to a pedal, of a resilient pad, a retaining plate, the side edges and one end edge of which are rolled over the corresponding edge portions of said pad, a foot stop on one end of said attachment, having a receiving groove for one end of the pad, and a tongue on the opposite end of the attachment, which is bent over to engage the opposite end of the pad.

8. The combination with a pedal, of a foot support having depending side edges, a stop at one end, and a clamping member on the other end for engaging the pedal, having a depending apertured abutment lip, said side edge having elongated apertures, a pin pivotally mounted in said apertures, a clamp secured to said pin, having abutments for engaging the adjacent edge of the pedal and the under side of the support and having a depending apertured abutment lip, and a bolt extending through said lips, having a clamping nut on one end.

In testimony whereof I affix my signature in presence of two witnesses.

FREDERICK C. GRANT.

Witnesses:
R. LAUER,
E. REID.

Copies of this patent may be obtained for five cents each, by addressing the "Commissioner of Patents, Washington, D. C."